United States Patent
Shen et al.

(10) Patent No.: US 9,285,538 B2
(45) Date of Patent: Mar. 15, 2016

(54) REDUCING TEMPERATURE DRIFT OF AN ARRAYED WAVEGUIDE GRATING

(71) Applicant: Lumentum Operations LLC, Milpitas, CA (US)

(72) Inventors: Jinxi Shen, San Ramon, CA (US); Barthelemy Fondeur, San Jose, CA (US); Wenlin Jin, Nepean (CA); David J. Chapman, San Jose, CA (US); Niki Liu, Shenzhen (CN)

(73) Assignee: Lumentum Operations LLC, Milpitas, CA (US)

( * ) Notice: Subject to any disclaimer, the term of this patent is extended or adjusted under 35 U.S.C. 154(b) by 47 days.

(21) Appl. No.: 14/060,433

(22) Filed: Oct. 22, 2013

(65) Prior Publication Data

US 2014/0112621 A1 Apr. 24, 2014

Related U.S. Application Data

(60) Provisional application No. 61/717,424, filed on Oct. 23, 2012.

(51) Int. Cl.
*G02B 6/34* (2006.01)
*G02B 6/12* (2006.01)

(52) U.S. Cl.
CPC .......... *G02B 6/12009* (2013.01); *G02B 6/1203* (2013.01); *G02B 6/12033* (2013.01)

(58) Field of Classification Search
CPC ........... G02B 6/12007; G02B 6/12009; G02B 6/12033; G02B 6/1203; G02B 6/293; G02B 6/29301; G02B 6/4215
See application file for complete search history.

(56) References Cited

U.S. PATENT DOCUMENTS

| | | | |
|---|---|---|---|
| 5,617,234 A * | 4/1997 | Koga et al. | 398/14 |
| 5,920,663 A | 7/1999 | Dragone | 385/15 |
| 6,075,239 A | 6/2000 | Aksyuk et al. | 250/229 |
| 6,701,043 B2 | 3/2004 | Delisle et al. | 385/37 |
| 6,760,521 B2 * | 7/2004 | Watanabe | 385/50 |
| 6,798,948 B2 | 9/2004 | Delisle et al. | 385/33 |
| 6,865,323 B2 | 3/2005 | Samiec et al. | 385/50 |
| 6,879,429 B2 | 4/2005 | Wong et al. | 359/290 |
| 6,954,566 B2 | 10/2005 | Johannessen | 385/37 |
| 7,236,660 B2 | 6/2007 | Ducellier et al. | 385/24 |
| 7,852,475 B2 | 12/2010 | Crafts et al. | 356/328 |
| 7,855,781 B2 * | 12/2010 | Suzuki | 356/73.1 |
| 7,872,735 B2 * | 1/2011 | Duggan et al. | 356/72 |
| 8,101,898 B2 | 1/2012 | Koste et al. | 250/206 |
| 8,346,086 B2 * | 1/2013 | Suzuki et al. | 398/79 |
| 8,457,459 B2 * | 6/2013 | Hasegawa et al. | 385/39 |
| 8,538,212 B2 * | 9/2013 | McGinnis | 385/37 |
| 2007/0041683 A1 | 2/2007 | Keyworth | 385/24 |

FOREIGN PATENT DOCUMENTS

JP 2009175634 8/2009 ............ G02B 26/08

* cited by examiner

*Primary Examiner* — Daniel Petkovsek
(74) *Attorney, Agent, or Firm* — Harrity & Harrity, LLP

(57) ABSTRACT

A wavelength selective device including an arrayed waveguide grating is disclosed. The wavelength selective device includes a MEMS mirror, which couples light from an input port to an elongate aperture of an input star coupler or slab of the arrayed waveguide grating. A controller tilts the MEMS mirror in response to a sensed temperature change of the arrayed waveguide grating, thereby lessening a sensitivity of the arrayed waveguide grating to the temperature change. The MEMS mirror can also be tilted to shift wavelengths of the wavelength channels of the arrayed waveguide grating by pre-defined amounts upon receiving a corresponding remote command.

20 Claims, 4 Drawing Sheets

REDUCING TEMPERATURE DRIFT OF AN ARRAYED WAVEGUIDE GRATING

CROSS REFERENCE TO RELATED APPLICATIONS

The present invention claims priority from U.S. patent application Ser. No. 61/717,424 filed Oct. 23, 2012, which is incorporated herein by reference.

TECHNICAL FIELD

The present invention relates to wavelength selective devices, and in particular to devices and methods for lessening thermal drift of arrayed waveguide gratings.

BACKGROUND OF THE INVENTION

Arrayed waveguide gratings (AWGs) are planar lightwave circuit (PLC) devices used for demultiplexing optical signals into individual wavelength channels. An AWG includes two slab-type star couplers, coupled to each other back-to-back via an array of planar waveguides of gradually increasing length. The gradually increasing waveguide length creates a gradually increasing optical delay on an inner surface of the output star coupler, which causes light at different wavelengths to couple into different output waveguides of the output star coupler. An AWG is a reciprocal device, that is, when used in a reverse direction, it can also combine wavelength channels into a common multiplexed signal. Thus, AWGs can be used for both multiplexing and demultiplexing of optical wavelength channels. Due to compactness and scalability of manufacturing, AWGs have found a wide application in optical networks.

One well-known drawback of AWGs is their thermal sensitivity. In an AWG, the optical path difference is created in the waveguide array, the refractive index of which depends on temperature. Because of this, center wavelengths of individual wavelength channels at the output of a silicon-based AWG drift with temperature, unless this drift is mitigated by some external means.

A common method to reduce AWG thermal drift is to stabilize the temperature of the PLC chip in which the AWG is formed. A heater and a temperature sensor are attached to the PLC chip. The temperature sensor is used to sense the PLC temperature. A temperature controller provides a signal to the heater to keep the temperature of the PLC chip constant. The temperature of the PLC chip is usually selected to be at the top of the required temperature range of the AWG device.

Temperature stabilization of AWGs has several drawbacks. One drawback is high electrical power consumption. Heaters having a power rating of at least several Watts are usually required to uniformly heat an AWG PLC chip. Another drawback is related to integration of thermally stabilized AWGs into a larger optical system. Heat released by the AWG heaters increases the overall system heat dissipation requirement, which calls for providing additional cooling means for the system. Furthermore, a time constant required for temperature stabilization and temperature tuning of heated AWGs is relatively large, typically ranging from few tens of seconds to few minutes.

Dragone in U.S. Pat. No. 5,920,663 discloses a method to reduce thermal drift of wavelength of an AWG by controllably deforming the PLC chip. The deformation stretches or compresses the optical lengths of the arrayed waveguides. Such changes give rise to birefringence effects that produce different propagation constants for the TE and TM waveguide modes. The deformation also provides some tuning of the transmission characteristics of the AWG, to correct for manufacturing tolerances. However, stress-induced birefringence increases polarization-dependent loss and polarization mode dispersion.

It has been recognized that an AWG can be tuned in wavelength by translating the input waveguide relative to the input star coupler of the AWG. Samiec et al. in U.S. Pat. No. 6,865,323 disclose an AWG device, in which an input waveguide is mounted on an expansion arm fixed on one end to a frame and having a holder on the other end. The expansion arm has a coefficient of thermal expansion (CTE) different from that of the frame. To restrict a movement of the input waveguide out of the PLC plane, a pair of flexible arms connect the holder to the frame. Detrimentally, the movable input waveguide in the Samiec device can cause the optical throughput of the AWG to be susceptible to shock and vibration, especially if the shock or vibration occurs in the PLC plane.

Delisle et al. in U.S. Pat. Nos. 6,701,043 and 6,798,048 disclose an AWG having a reflective input that permits variable coupling to compensate for AWG temperature drift. Referring to FIG. 1, an athermal reflective coupling 60 of a Delisle AWG 22 includes a thermally actuated pivot mechanism for supporting a mirror 32. The athermal coupling 60 includes a first arm 62 of a material having a first coefficient of thermal expansion and a second arm 64 of a different material having a second coefficient of thermal expansion. Each arm 62, 64 abuts a substrate edge 19. The first arm 62 supports a mirror frame 66, which is coupled to the second arm 64 at one side, and which carries a mirror 32 on another side of the first arm 62. A flex or pivot point 68 at the first arm 62 forms a rotation center, about which the mirror frame 66 pivots as shown by an arrow 21 in response to a differential thermal expansion of the first and second arms 62, 64. Light emitted by an input optical fiber 10 mounted to a holder 26 is collimated by a lens 30 and impinges on the mirror 32 as a collimated beam. The collimated beam is reflected back into the lens 30 at an angle determined by the pivot of the athermal coupling 60. The angle is translated by the lens 30 as an offset, thus shifting the input point at the input plane 20 of an input slab 12, and thereby at least partially compensating the thermal drift of the AWG 22.

The Samiec and Delisle AWG devices have drawbacks of vibration sensitivity and a relatively slow response to an abrupt temperature change. When the temperature changes quickly, thermal gradients between the PLC and the thermally expanding beams can cause time-varying wavelength drift. Furthermore, each PLC chip possesses slightly different thermal wavelength drift characteristics, requiring individual mechanical tuning of thermal response of each device, e.g. by adjusting individual lengths of the arms 62, 64. This makes the Samiec and Delisle AWG devices more difficult to mass produce.

SUMMARY OF THE INVENTION

It is a goal of the invention to provide a quickly tunable and manufacturable temperature-compensated AWG capable of operating at a moderate electrical power consumption.

The present invention advantageously utilizes a microelectro-mechanical system (MEMS) having a tiltable mirror for reflecting input light onto an input slab of an AWG. A MEMS controller is used to controllably tilt the MEMS mirror to compensate for temperature drifts of the AWG and/or to introduce controllable wavelength/frequency shifts. Low power consumption MEMS controllers are preferred, because they can be powered by an incoming light signal converted into electricity. Utilization of MEMS mirrors in AWG-based wavelength selective devices enables construction of manufacturable, tunable AWG devices with a reduced sensitivity to temperature drifts and mechanical vibration.

In accordance with the invention, there is provided a wavelength selective device comprising:

an input port for inputting an optical beam;

a tiltable MEMS mirror optically coupled to the input port, for reflecting the optical beam;

a focusing element optically coupled to the MEMS mirror, for focusing the reflected optical beam into a focal spot displaceable by varying an angle of tilt of the MEMS mirror;

an arrayed waveguide grating comprising an input slab having an elongate aperture for receiving the focal spot, and a plurality of output waveguides for outputting wavelength sub-beams of the optical beam, wherein the input slab is disposed so that when the angle of tilt of the MEMS mirror is varied, the focal spot is displaced along the elongate aperture;

a temperature sensor thermally coupled to the arrayed waveguide grating, for sensing a change of temperature thereof; and a controller electrically coupled to the temperature sensor and the tiltable MEMS mirror, and configured for varying the angle of tilt upon sensing the arrayed waveguide temperature change by the temperature sensor, so as to lessen a wavelength drift of the wavelength sub-beams induced by the temperature change.

Preferably, the MEMS controller has a low electrical power consumption, for example 10 mW or less, or even 1 mW or less. In one embodiment, an optical splitter splits a portion of the input optical beam to a photoelectric generator such as a photovoltaic cell, which powers the MEMS controller. A few milliwatt of incoming optical power can be sufficient to power the MEMS controller, thus providing thermal stabilization of the AWG without requiring a dedicated power line or an internal battery.

In one embodiment, the controller is configured to vary the angle of tilt of the tiltable MEMS mirror, so as to shift wavelengths of the wavelength sub-beams by a controllable amount, upon receiving a corresponding external command.

In accordance with the invention, there is further provided a method of thermal stabilization of an AWG having an input slab having an elongate aperture for free-space coupling of an optical beam, and a plurality of output waveguides for outputting wavelength sub-beams of the optical beam, the method comprising:

(a) coupling the optical beam to the elongate aperture of the input slab by (I) coupling the optical beam to a tiltable MEMS mirror for reflecting the optical beam; and (II) directing the reflected optical beam to a focusing element for focusing the reflected optical beam into a focal spot on the elongate aperture, so that when the MEMS mirror is tilted by a first angle, the focal spot is displaced by a first displacement along the elongate aperture;

(b) sensing a change of temperature of the arrayed waveguide grating; and (c) varying the first angle so as to lessen a wavelength drift of the wavelength sub-beams due to the change of temperature sensed in step (b).

BRIEF DESCRIPTION OF THE DRAWINGS

Exemplary embodiments will now be described in conjunction with the drawings, in which.

DETAILED DESCRIPTION OF THE INVENTION

While the present teachings are described in conjunction with various embodiments and examples, it is not intended that the present teachings be limited to such embodiments. On the contrary, the present teachings encompass various alternatives and equivalents, as will be appreciated by those of skill in the art.

Figure 1:
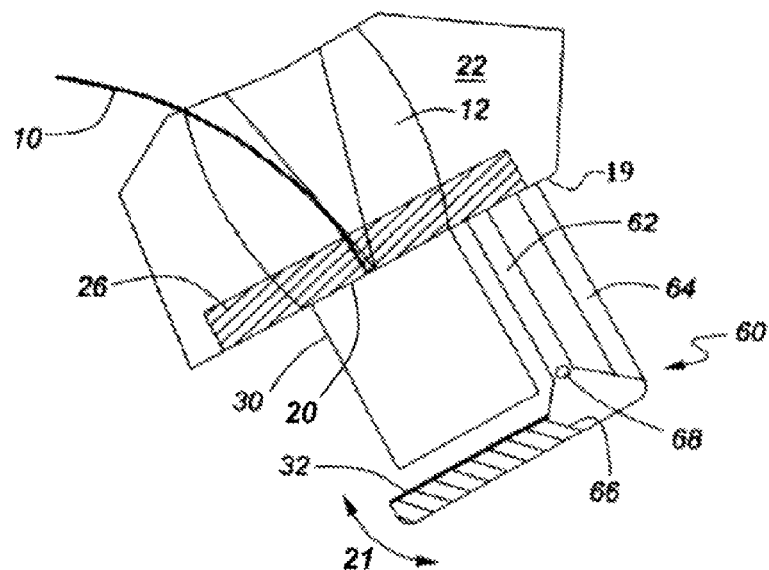
FIG. 1 is a plan view of a prior-art temperature-compensated AWG.
Figure 2:
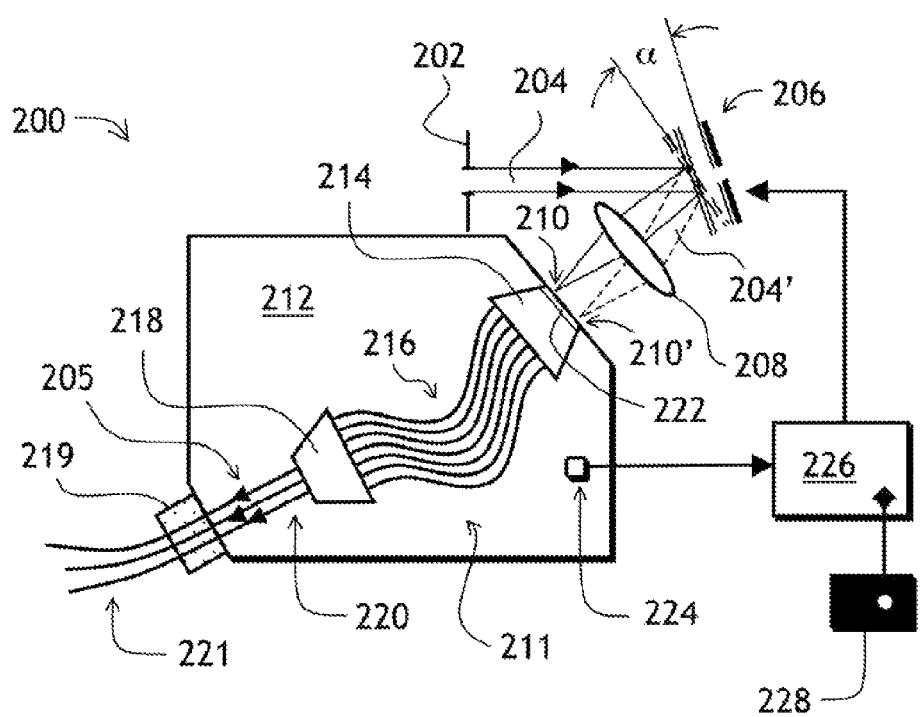
FIG. 2 is a schematic view of a wavelength selective device of the invention.

Referring to FIG. 2, a wavelength selective device 200 of the invention includes an input port 202 for inputting an optical beam 204. A tiltable MEMS mirror 206 is optically coupled to the input port 202. The tiltable MEMS mirror 206 reflects the optical beam 204 and redirects it towards a lens 208 optically coupled to the MEMS mirror 206. The lens 208 focuses the reflected optical beam 204 into a focal spot 210, which is displaceable by varying an angle of tilt $\alpha$ of the MEMS mirror 206. Another focusing element, such as a concave mirror, can be used in place of the lens 208.

The wavelength selective device 200 includes an AWG 211 implemented in a PLC chip 212. The AWG 211 has an input slab 214, a waveguide array 216, an output slab 218, and a plurality of output waveguides 220 for outputting wavelength sub-beams 205 of the optical beam 204. In the embodiment shown, the output waveguides 220 are coupled, via a fiber array 219 joined to a rear side of the PLC chip 212, to a plurality of output optical fibers 221.

The input slab 214 has an elongate aperture 222 for receiving the focal spot 210. The input slab 214 is disposed so that when the angle of tilt $\alpha$ of the MEMS mirror 206 is varied, the focal spot 210 is displaced along the elongate aperture 222. For example, tilting the MEMS mirror 206 by the angle $\alpha$ results in a shift of the optical beam 204 to a position 204' shown with a dashed line, causing the focal spot 210 to shift to a position 210' on the aperture 222. The shift is exaggerated in FIG. 2 for clarity.

A temperature sensor 224 is thermally coupled to the PLC chip 212 for sensing a change of temperature of the PLC chip 212 and the AWG 211. A controller 226 is electrically coupled to the temperature sensor 224 and the tiltable MEMS mirror 206, and configured for varying the angle of tilt $\alpha$ upon sensing the PLC chip 212 temperature change, so as to compensate, or at least lessen, a wavelength drift of the wavelength sub-beams 205 induced by the temperature change.

In the embodiment shown, the wavelength selective device 200 includes an electrical power source 228, such as an internal battery or a photoelectric power generator. Using MEMS technology and a low-power controller 226 allows utilization of a low-power electrical power source 228. To conserve electrical power, the controller can have a power rating of 10 mW or less, or even 1 mW or less.

Figure 3:
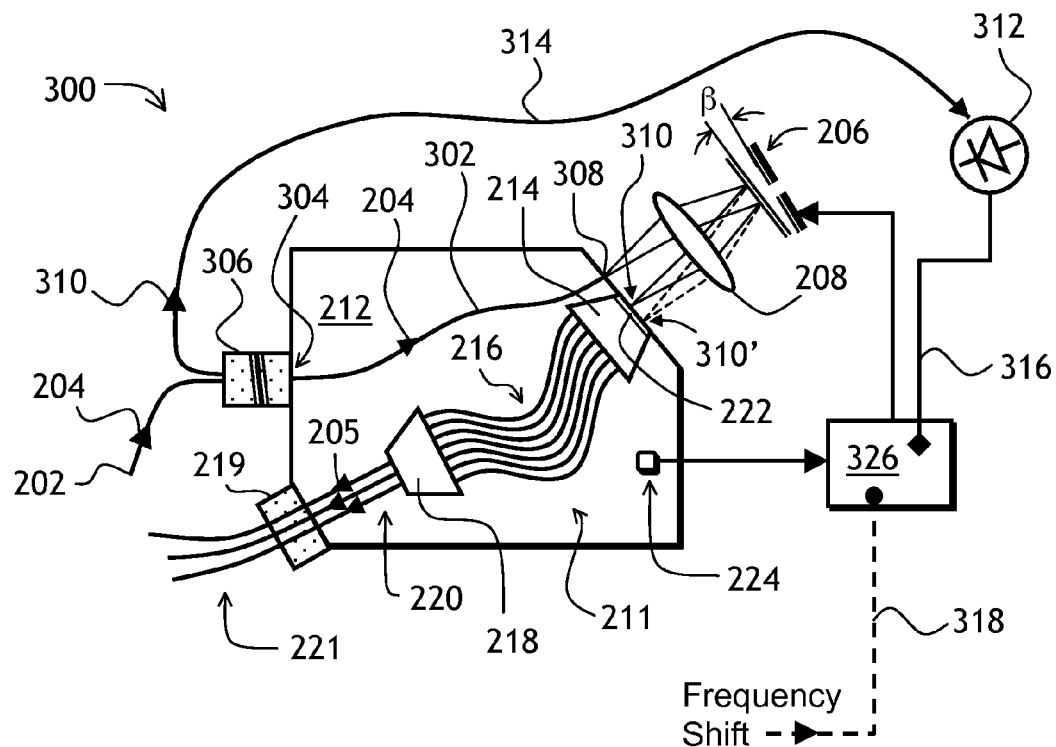
FIG. 3 is a schematic view of a wavelength selective device of the invention powered by an optical signal.

Turning to FIG. 3 with further reference to FIG. 2, a wavelength selective device 300 is similar to the wavelength selective device 200 of FIG. 2. The wavelength selective device 300 of FIG. 3 further includes an input waveguide 302 disposed on or within the PLC 212. The input waveguide 302 has an input end 304 optically coupled to the input port 202 via a beam splitter 306, and an output end 308 optically coupled to the tiltable MEMS mirror 206. In the embodiment shown, the output end 308 is coupled to the tiltable MEMS mirror 206 via the lens 208, resulting in a more compact construction. In operation, the splitter 306 splits a portion 310 of the optical beam 204, for example 5% of optical power or less, and directs it to a photovoltaic cell 312 coupled to the splitter 306 via an optical fiber 314. The photovoltaic cell 312 receives the split portion 310 of the optical beam 204 and converts the received portion 310 into electrical power supplied via a cable 316 to a controller 326. Another type of a photoelectric current generating device, such as a photodiode, may be used in place of the photovoltaic cell 312.

Preferably, the photoelectric generator has a maximum power rating of 10 mW or less, and more preferably 1 mW or less. This allows one to split only a small portion of the input beam 204 for powering purposes. For instance, at the input optical power of 100 mW and the power consumption by the controller 326 of 1 mW or less, only 1%-2% of the input light energy needs to be used to power the controller 326 and the MEMS 206. 2% of optical power loss corresponds to an extra insertion loss for the optical signal 204 of less than 0.1 dB, which is quite acceptable in view of a typical AWG loss of 2-3 dB.

In one embodiment, the splitter 306 is wavelength-selective, so that the split portion 310 has a different wavelength than the wavelength sub-beams 205. This allows one to add the "powering light" to the optical beam 204 at a remote location, and substantially not spend the energy of the wavelength sub-beams 205 of the optical beam 204 to power the controller 326 powering the MEMS 206. This can relax the electrical power consumption requirement for the controller 326.

Figure 4:
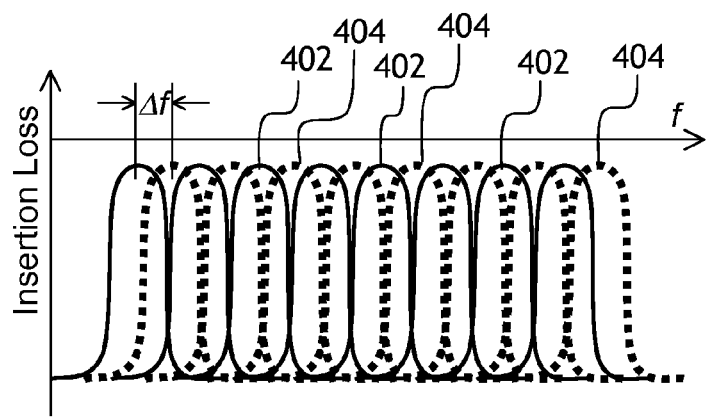
FIG. 4 is a combined optical frequency spectrum of remotely tunable wavelength channels of the wavelength selective device of FIG. 3.

The controller 326 of FIG. 3 is configured not only for thermal stabilization as the controller 226 of FIG. 2, but also to shift wavelengths of the wavelength sub-beams 205 by a controllable amount upon receiving a corresponding external command. The controller 226 is configured to receive a "Frequency Shift" command via a dedicated control line 318. Upon receiving the "Frequency Shift" command, the controller 226 tilts the MEMS mirror 206 by an additional angle β, thereby shifting the focal spot on the elongate aperture 22 from a first position 310 to a second position 310'. The corresponding optical beams for the second position 310' are shown in FIG. 3 with dashed lines. Turning now to FIG. 4 with further reference to FIG. 3, insertion loss spectra 402 of the wavelength sub-beams 205 shift by a controllable optical frequency shift Δf upon receiving the "Frequency Shift" command. The shifted spectra positions are shown in FIG. 4 with dashed lines 404. This frequency-shifting functionality can also be implemented in the controller 226 of FIG. 2.

The temperature dependence of central wavelengths or frequencies of the wavelength channels 205 can be calibrated with high precision, for example to 10 pm or better. As a result, the spectra 402 can be shifted in frequency with high precision. This is particularly important in applications where 50 GHz frequency grid is used to transmit 40 GBit/second and even 100 GBit/second modulated optical signals. Precise frequency positioning results in an optimum bandwidth utilization for such applications.

Figure 5:
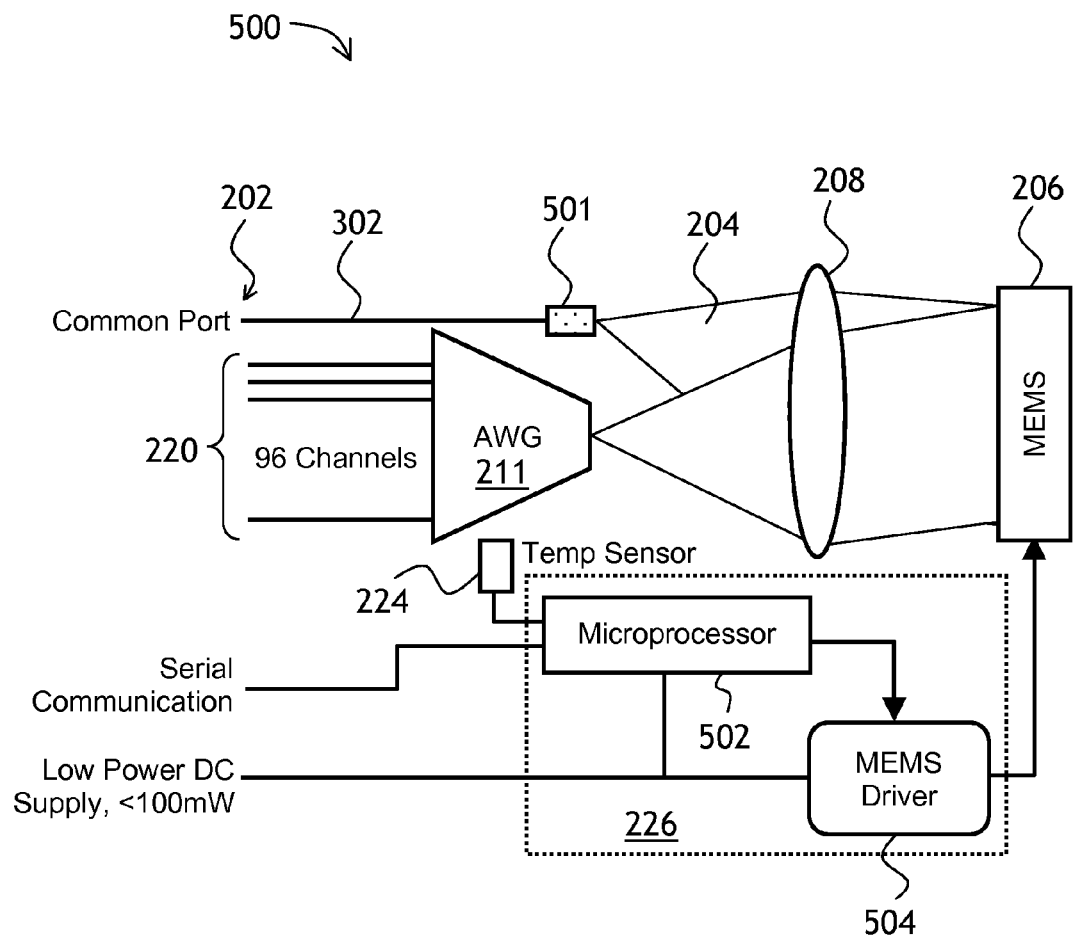
FIG. 5 is a block diagram of an embodiment of the wavelength selective device of the invention.

Referring to FIG. 5, a wavelength selective device 500 is a variant of the wavelength selective device 200 of FIG. 2, additionally including the input waveguide 314 ending with a launch port 501, which is coupled to the MEMS 206 via the lens 208. The controller 226 includes a microprocessor 502 in serial communication with an external device, not shown, for shifting the optical frequency/wavelength, and a MEMS driver 504 for generating DC voltages required to tilt the MEMS mirror 206 at a pre-defined angle. The frequency vs. temperature, and frequency shift vs. MEMS angle calibrations are performed to reduce the temperature dependence of the 96-channel AWG 211 to less than 1 GHz of the optical frequency drift, or less than about 10 pm of wavelength drift, in the working temperature range of 0° C. to 70° C. Either a local power supply rated at 100 mW or less, or a photo-generated power as explained above with reference to FIG. 3, can be used to power the microprocessor 502 and the MEMS driver 504.

Figure 6:
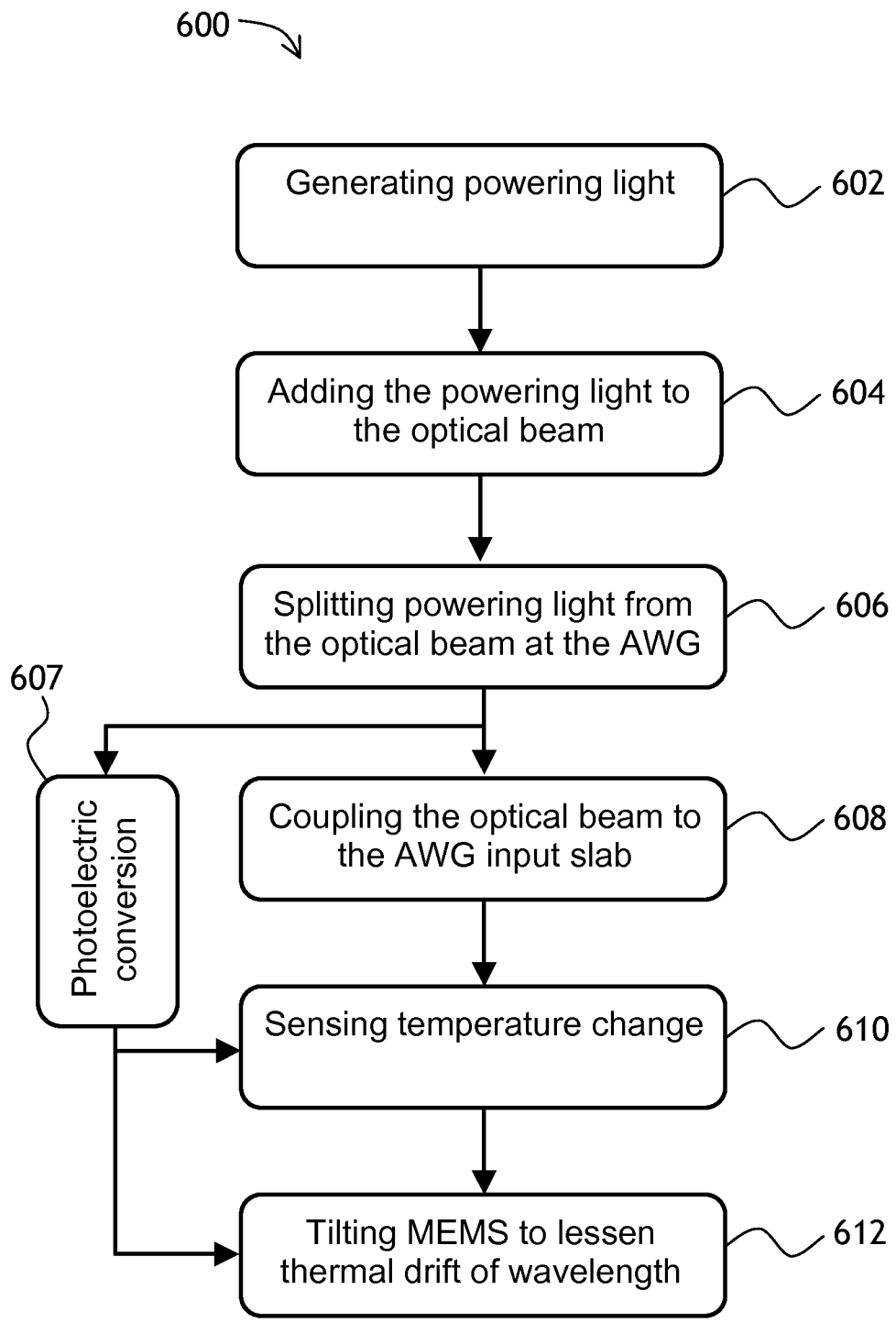
FIG. 6 is a flow chart of an exemplary method of thermal stabilization of an arrayed waveguide grating according to the invention.

Turning to FIG. 6 with further reference to FIG. 3, a method 600 of thermal stabilization of the AWG 11 includes a step 602 of generating powering light at a powering wavelength different from wavelengths of the optical beam 204. In a step 604, the powering light is added to the optical beam 204, for example, by means of a wavelength division multiplexor. Steps 602 and 604 can be performed at a remote location, from which the optical beam travels (e.g. inside an optical fiber) towards the wavelength selective device 300. In a step 606, the portion 310 of the optical beam 204, containing the powering light, is split from the optical beam 204 using the splitter 306, and directed towards the photovoltaic cell 312 for conversion into electric power in a step 607.

In a step 608, the optical beam 204 is coupled to the input slab 214 of the AWG 211. This is done by first coupling the optical beam 204 to the tiltable MEMS mirror 206 for reflecting the optical beam 204; and second, directing the reflected optical beam 204 to the lens 208 (or another suitable focusing element) for focusing the reflected optical beam 204 into the focal spot 310 on the elongate aperture 222 of the input slab 214. When the MEMS mirror 206 is tilted by a predefined angle, the focal spot 310 is displaced by a first displacement along the elongate aperture 222. For example, when the MEMS mirror 206 is tilted by the angle β (FIG. 3), the focal spot 310 shifts to the position 310'. In a step 610, the temperature sensor 224 senses the temperature of the AWG 211. Finally, in a step 612, the MEMS 206 is tilted to vary the angle β, so as to lessen a wavelength drift of the wavelength sub-beams 205 due to the change of temperature sensed by the temperature sensor 224 in step 610. The electric power generated in step 607 is used by the controller 326 to perform steps 610 and 612.

First three steps 602, 604, and 606 of the method 600 are optional, and are taken in cases where the controller 326 is powered by photoelectric power. The last three steps 608, 610, and 612 of the method 600 can also be used to operate the wavelength selective device 200 of FIG. 2. Regardless of the power source, it is preferable that the controllers 226 and 326 have low power consumption of no more than 10 mW, and more preferably no more than 1 mW. The splitting ratio of the splitter 306 is selected in accordance with the power rating of the controllers 226 or 326. The method 600 can also include an optional step of tilting the MEMS mirror 206 by the additional angle β so as to shift optical frequencies of the wavelength sub-beams 205 by a pre-defined amount. This optional step can be performed upon receiving a command from a remote location.

The foregoing description of one or more embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A wavelength selective device comprising:
an input port for inputting an optical beam;
a splitter for splitting a portion of the optical beam to create a first split portion of the optical beam;
a reflector, optically coupled to the input port, for varying an angle of a second split portion of the optical beam;
a focusing element, optically coupled to the reflector, for focusing the second split portion of the optical beam into a focal spot displaceable by varying the angle of the second split portion of the optical beam;
an arrayed waveguide grating comprising an input slab, having an elongate aperture for receiving the focal spot, and a plurality of output waveguides for outputting wavelength sub-beams of the second split portion of the optical beam,
wherein the input slab is disposed so that, when the angle of the second split portion of the optical beam is varied, the focal spot is displaced along the elongate aperture;
a temperature sensor, thermally coupled to the arrayed waveguide grating, for sensing a change of temperature of the arrayed waveguide grating; and
a controller, electrically coupled to the temperature sensor and the reflector, for receiving the first split portion of the optical beam and varying the angle of the second split portion of the optical beam upon sensing the change of temperature of the arrayed waveguide grating, so as to lessen a wavelength drift of the wavelength sub-beams induced by the change of temperature of the arrayed waveguide grating,
wherein the first split portion of the optical beam is used to power the controller.

2. The wavelength selective device of claim 1, wherein the controller has a power rating of 10 mW or less.

3. The wavelength selective device of claim 1, wherein the controller has a power rating of 1 mW or less.

4. The wavelength selective device of claim 1, further comprising:
an input waveguide having an input end optically coupled to the input port and an output end optically coupled to the reflector.

5. The wavelength selective device of claim 4, wherein the output end is coupled to the reflector via the focusing element.

6. The wavelength selective device of claim 1, further comprising:
a photoelectric generator, optically coupled to the splitter, for receiving the first split portion of the optical beam and converting the received first split portion of the optical beam into electrical power for powering the controller.

7. The wavelength selective device of claim 6, wherein the photoelectric generator has a maximum power rating of 10 mW or less.

8. The wavelength selective device of claim 6, wherein the photoelectric generator has a maximum power rating of 1 mW or less.

9. The wavelength selective device of claim 1, wherein the splitter is wavelength-selective so that the first split portion of the optical beam has a different wavelength than the wavelength sub-beams.

10. The wavelength selective device of claim 6, wherein the photoelectric generator comprises a photovoltaic cell.

11. The wavelength selective device of claim 1, wherein the controller is configured to vary the angle of the second split portion of the optical beam so as to shift optical frequencies of the wavelength sub-beams by a first frequency shift upon receiving a corresponding external command.

12. The wavelength selective device of claim 11, wherein the controller comprises a microprocessor, coupled to the temperature sensor, configured to receive the external command, and a driver, coupled to the microprocessor, for varying the angle of the second split portion of the optical beam.

13. The wavelength selective device of claim 1, wherein in operation, the wavelength drift is 10 pm or less.

14. A method comprising:
splitting a portion of an optical beam to create a first split portion of the optical beam that is received by a controller,
wherein the first split portion of the optical beam is used to power the controller;
coupling a second split portion of the optical beam to an elongate aperture of an input slab of an arrayed waveguide grating by:
coupling the second split portion of the optical beam to a reflector for varying an angle of the second split portion of the optical beam; and
directing the second split portion of the optical beam to a focusing element for focusing the second split portion of the optical beam into a focal spot on the elongate aperture, so that, when the angle of the second split portion of the optical beam is changed, the focal spot is displaced by a first displacement along the elongate aperture;
sensing, by the controller, a change of temperature of the arrayed waveguide grating;
varying, by the controller, the angle of the second split portion of the optical beam so as to lessen a wavelength drift of wavelength sub-beams of the second split portion of the optical beam based on the change of temperature; and
outputting the wavelength sub-beams of the second split portion of the optical beam.

15. The method of claim 14, wherein the controller has a power consumption of 10 mW or less.

16. The method of claim 14, wherein the controller has a power consumption of 1 mW or less.

17. The method of claim 14, further comprising:
directing the first split portion of the optical beam to a photoelectric generator for conversion into electric power; and
using the electric power to power the controller.

18. The method of claim 14, further comprising:
generating powering light at a powering wavelength different from wavelengths of the second split portion of the optical beam; and
adding the powering light to the second split portion of the optical beam.

19. The method of claim 14, further comprising:
varying the angle of the second split portion of the optical beam so as to shift optical frequencies of the wavelength sub-beams by a pre-defined amount.

20. The method of claim 19, wherein, when varying the angle, the method includes:
varying the angle of the second split portion of the optical beam based on receiving a command from a remote location.

* * * * *